July 4, 1933.  D. O. CLEGG  1,917,097
GENERATOR REGULATOR FOR AUTOMOTIVE VEHICLES
Filed May 29, 1931  2 Sheets-Sheet 1
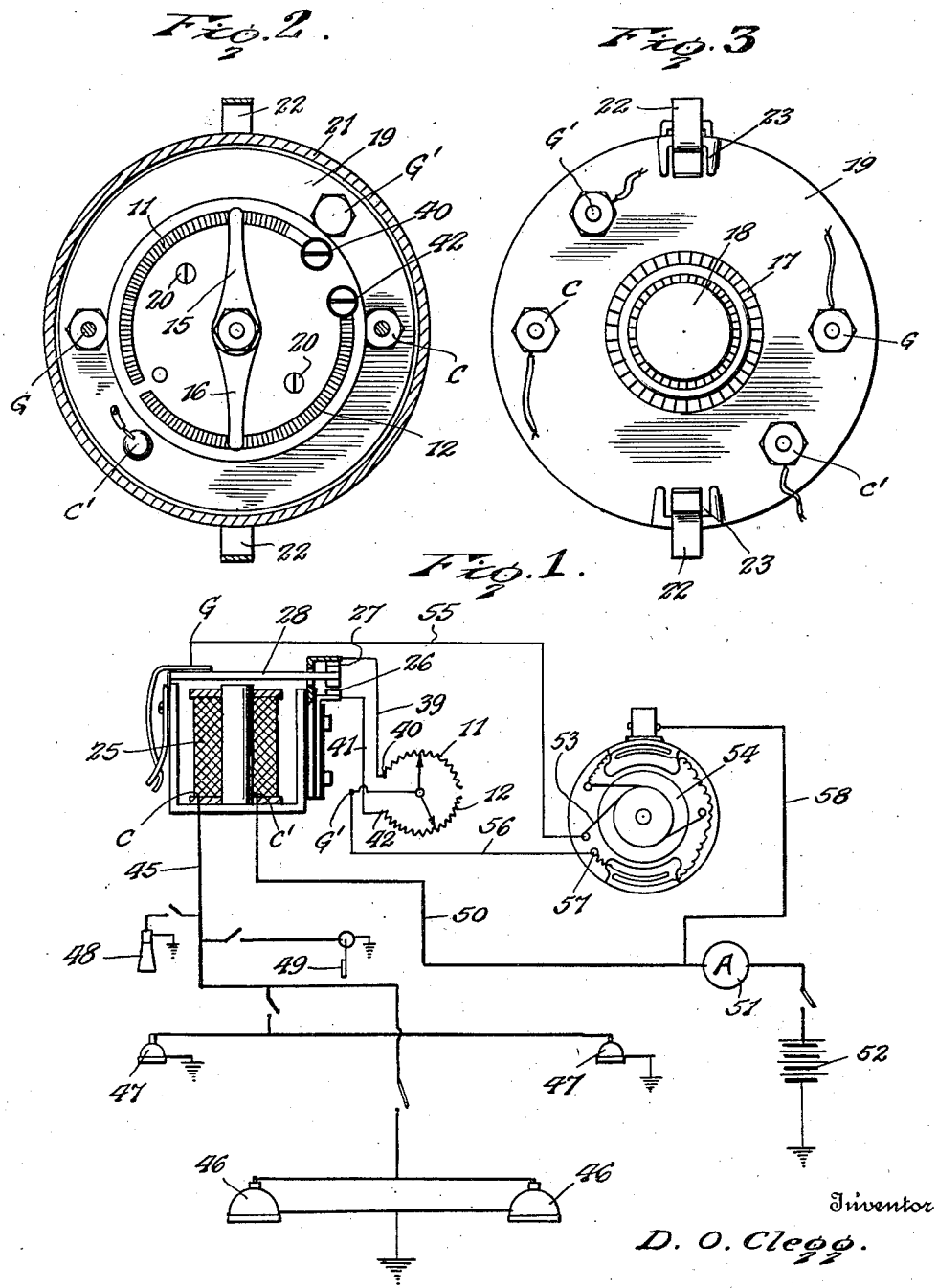

July 4, 1933.  D. O. CLEGG  1,917,097
GENERATOR REGULATOR FOR AUTOMOTIVE VEHICLES
Filed May 29, 1931  2 Sheets-Sheet 2
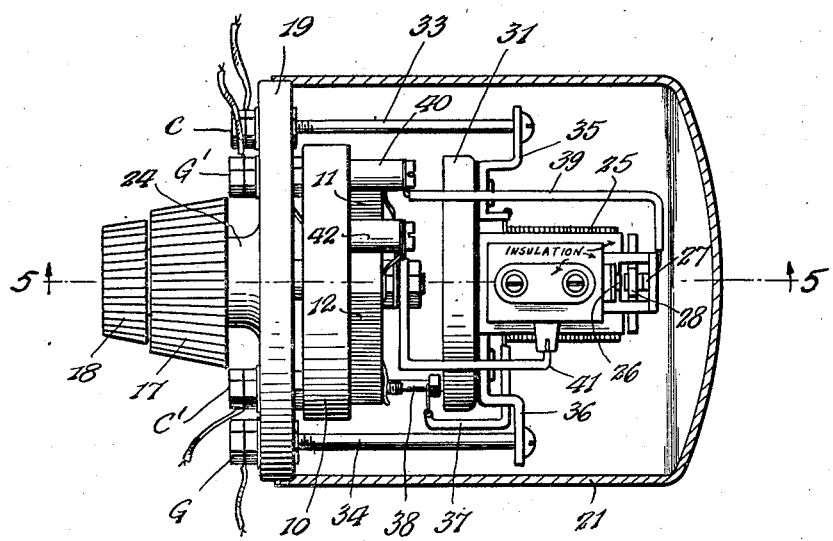
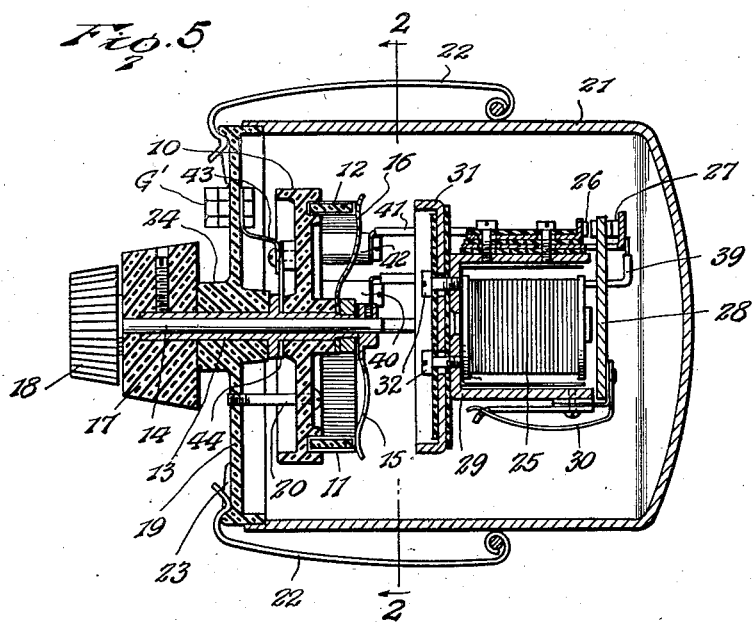
Inventor
D. O. Clegg.
By Lacey & Lacey, Attorneys Patented July 4, 1933

1,917,097

UNITED STATES PATENT OFFICE

DOLPH O. CLEGG, OF BELLEFONTAINE, OHIO

GENERATOR REGULATOR FOR AUTOMOTIVE VEHICLES

Application filed May 29, 1931. Serial No. 541,100.

This invention relates to generator regulators for automotive vehicles and has for an object to provide apparatus for automatically stepping up the output of a generator of the third brush type when the electrical appliances, such as headlights, electric windshield visor, etc., are energized, and automatically reducing the output of the generator when said appliances are deenergized whereby to maintain an approximately constant charging rate of the storage battery at all times.

A further object is to provide a small, compact remote control device which may be manually adjusted to automatically regulate third brush generators to deliver a predetermined output when the electrical appliances are being used, and to deliver a smaller predetermined output when the appliances are not being used.

A further object is to provide a device of the class described which is inexpensive to manufacture, will be formed of a small number of simple parts which will not easily get out of order, and which may be easily and quickly mounted on the instrument board or at any convenient location on the vehicle.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a diagrammatic view showing the circuit wiring of a system of electrical distribution including my improved remote control apparatus for the third brush type generator, Figure 2 is a cross section taken on the line 2—2 of Figure 5 showing the rheostats, Figure 3 is an end elevation showing the rheostat knobs and the terminals of the electrical connections, Figure 4 is a side elevation of the regulating apparatus with the housing shown in section, and Figure 5 is a longitudinal section taken on the line 5—5 of Figure 4.

Referring now to the drawings in which like characters of reference designate similar parts in the various views, 10 designates a disk support of insulating material, upon the inner face of which is mounted a pair of curved concentric resistance elements 11 and 12 which are in the form of an annulus, as best shown in Fig. 2. A tubular shaft 13 is provided, in which is nested or axially disposed a shaft 14. Both shafts are equipped with corresponding brushes 15 and 16 which engage the corresponding resistance elements, as best shown in Figs. 3 and 5. The shafts are provided with corresponding knobs 17 and 18. Thus two rheostats are provided which may be independently controlled by rotation of their actuating knobs in the usual and well-known manner.

A housing for the rheostats is provided and comprises a flanged base support 19 to which the insulating disk 10 of the rheostat assembly is removably secured by screws 20 or other connectors. A metal cap 21 is fitted over the flange of the base support and is removably confined thereupon by hinged spring clamps 22 which terminally hook into depressions 23 in the support, as best shown in Figs. 3 and 5. The support is provided with an axial hub 24 through which the shafts of the resistance elements are passed.

Disposed in the housing cap 21 in axial alinement with the rheostat assembly is a relay comprising a coil 25, a pair of switch contacts 26 and 27, and an armature 28. The armature is pivoted on one leg of a U-shaped bracket 29, as best shown in Fig. 5, and is spring-pressed against the outer contact 26 by means of a leaf spring 30. The relay bracket 29 is secured to a metal supporting disk base 31 by means of screws 32 and is insulated from the base. Both switch contacts 26 and 27 are secured to the other leg of the U-shaped bracket and are insulated from it and from each other, as best shown in Figs. 1 and 5.

As best shown in Fig. 4, the relay base 31 is secured to the housing base 19 by means of long screws 33 and 34. The outer ends of the screws form binding posts, designated by C, identifying one of the coil terminals, and G identifying the third brush terminal of the generator field, as will be presently explained. The inner ends of the screws are connected to corresponding brackets 35 and 36 which are riveted or otherwise secured to the metal base 31 of the relay and are insulated from said base. The bracket 36 is integral with the U-shaped bracket 29 and electrically connects the armature 28 with the G binding post.

As also shown in Fig. 4, one end of the coil 25 is connected to the bracket 35 and, through the bracket and screw 33, is electrically connected to the C binding post. The other end of the coil is connected by a wire 37 to a screw 38 which passes through the housing base 19, which latter is formed of insulating material, and terminates in a binding post, designated by C', which latter identifies said end of the relay coil when connected up the wiring, as will presently be explained.

Said last-named end of the coil, as also will be later explained, is connected with the feed wire from the generator.

To complete the circuit wiring of the device, the outer switch contact 27 of the relay is connected by a wire 39 to the terminal 40 of the resistance element 11. The inner switch contact 26 is connected by a wire 41 to the terminal 42 of the resistance element 12. As shown in Fig. 5, both brushes of the resistance elements are connected by metal strips 43 and 44 to a binding post, designated G', carried by the base 19 of the housing, and which, as will later appear, is connected in circuit with the terminal at the end of the field of the generator.

It will thus be clear that the resistance element 11 is in series with the switch contact 27 and terminal G which designates the third brush of the generator field. The resistance element 12 is in series with the switch contact 26 and with the terminal G' which designates the end of the generator field.

By now referring to Fig. 1, it will be seen that the terminal C is connected by a wire 45 with the electrical appliances, such as the headlights 46, cowl lights 47, horn 48, windshield visor 49, and all other electrical appliances of the vehicle, while the terminal C' is connected by a wire 50 through the ammeter 51 to the storage battery 52. Consequently, when the ignition switch is on and the switch for the lights or any other appliances is closed, the coil 25 of the relay will be energized and attract the armature 28 to disengage the same from the contact 27 and engage it with the contact 26. Therefore, it may be said that the electrical appliances control the operation of the relay.

By again referring to Fig. 1, it will be seen that the third brush 53 of the generator 54 is connected by a wire 55 to the terminal G which is in series with the armature 28, contact 27, and resistance 11. Consequently, when the headlights or other appliances are not in use, the circuit just traced will be through the resistance element 11 and terminal G', which is connected by a wire 56 to the terminal 57 at the end of the field of the generator. Thus, the resistance of the resistance element 11 is in circuit with the field of the generator to maintain the output through the usual feed wire 58 to the battery at a predetermined rate for charging the battery.

When, however, any one of the electrical appliances is being used, as above explained, the coil of the relay is energized and attracts the armature 28, whereupon a circuit may be traced through the armature, contact 26, resistance element 12, which latter is much less than the resistance element 11, and through the terminal G', wire 56, to the terminal 57 at the end of the field of the generator. Due to the low resistance of the resistance element 12 now being in the field of the generator, the output of the generator will be stepped up to compensate for the increased load resulting from the use of the electrical appliance and maintain said predetermined rate of charging the battery constant.

It will be observed that by turning either of the control knobs of the rheostats, the resistance of either rheostat may be changed independently of each other to produce any desired charging rate of the battery, regardless of whether the electrical appliances are being used or not.

In practice, the third brush is moved to its outer limit of movement and left at this point before the remote control or regulating apparatus, above described, is hooked up.

From the above description, it is thought that the construction and operation of my invention will be fully understood without further explanation.

Having thus described the invention, I claim:

1. In a system of electrical distribution, the combination with a generator of the third brush type, a storage battery, and electrical appliances, said generator and battery being each connected in circuit and to circuits containing the appliances, of manually adjustable variable resistance units in circuit with the third brush for varying the resistance of the field of the generator, and a relay in the appliance circuit controlled automatically by current to the appliances to cut out one of the resistances and throw in another of the resistances whereby to maintain a predetermined rate of charge of the battery regardless of whether the electrical appliances are energized or de-energized.

2. In a system of electrical distribution, the combination with a generator of the third brush type, a storage battery, and electrical appliances, said generator and battery being each connected in circuit and to circuits containing the appliances, of a pair of manually adjustable variable resistance units of different values adapted to be selectively connected in circuit with the third brush and varying the resistance of the field of the generator, the small resistance unit modifying the generator field to increase the output of the generator for simultaneously supplying said appliances and charging said battery at a predetermined rate, the large resistance unit modifying the generator field to reduce the output of the generator to maintain said predetermined rate of the charge of the battery when said appliances are de-energized, a relay in the appliance circuit controlled by energizing of said appliances and electrically connected in circuit with the resistance units for automatically disconnecting one of said units and connecting the other of said units in the field of the generator, and means for manually varying the resistance of each unit independently of the other unit.

3. Apparatus for regulating generators of the third brush type comprising a relay, a pair of rheostats, supports for the rheostats and relay, electrical connections connecting one of the rheostats in circuit with one of the switch contacts of the relay, electrical connections connecting the other rheostat in circuit with the other switch contact of the relay, electrical connections adapted to connect the relay armature with the third brush of a generator, electrical connections adapted to connect both rheostats with the end of the generator field, and electrical connections adapted to connect the ends of the relay coil in circuit with the feed line from the generator to any electrical appliances whereby energizing of the appliances energizes the relay coil to move the relay armature and cut one of said rheostats into the field of the generator, and whereby de-energizing of the appliances de-energizes the relay coil to release the armature for cutting the other of said rheostats into the generator field.

4. Apparatus for regulating generators of the third brush type comprising a relay, a support for the relay, a pair of curved resistance elements on the inner face of the support, knobs on the outer face of the support, shafts carried by the knobs passing through said outer face, radial brushes carried by the shafts engaging said resistance elements, electrical connections connecting the end of one of the resistance elements with one of the switch contacts of the relay, electrical connections connecting the end of the other resistance element to the other switch contact of the relay, electrical connections adapted to connect the radial brushes with the terminal at the end of the field of a generator, electrical connections adapted to connect the relay armature with the third brush of the generator, and electrical connections adapted to connect both ends of the relay coil in circuit with the feed wire of the generator and with electrical appliances which may be supplied by the generator whereby said appliances control the relay to cut either one of said resistance elements into the field of the generator and modifying the output of the generator.

5. Apparatus for regulating generators of the third brush type comprising a relay, an insulating support for the relay, an insulating support in rear of the relay support and disposed in axial alignment therewith, means for rigidly securing said supports together as a unit in spaced relationship, a pair of curved resistance elements of equal radius forming an annulus on one face of the rear support and disposed between both supports, a tubular shaft passing through one of the supports, a shaft disposed axially in the tubular shaft, knobs on the outer ends of both shafts, brushes radially disposed on the inner ends of both shafts and engaging respective resistance elements, electrical connections connecting one of the resistance elements to one of the switch contacts of the relay, electrical connections connecting the other of the resistance elements with the other switch contact of the relay, electrical connections adapted to connect both shafts with the terminal at the end of the field of a generator, electrical connections adapted to connect the armature of the relay with the third brush of the generator, and electrical connections adapted to connect both ends of the relay coil with the output terminal of the generator and with electrical appliances which may be supplied by the generator whereby energizing and de-energizing of the appliances correspondingly energizes and de-energizes the relay coil to move the armature to engage one or the other of said switch contacts and cut the corresponding resistance element into the field of the generator for modifying the field to vary the generator output.

In testimony whereof I affix my signature.

DOLPH O. CLEGG.